Aug. 9, 1960 W. G. LIPPERT 2,948,438
CORN AND SALT DISPENSER FOR POPCORN MACHINES
Filed Sept. 29, 1958 2 Sheets-Sheet 1
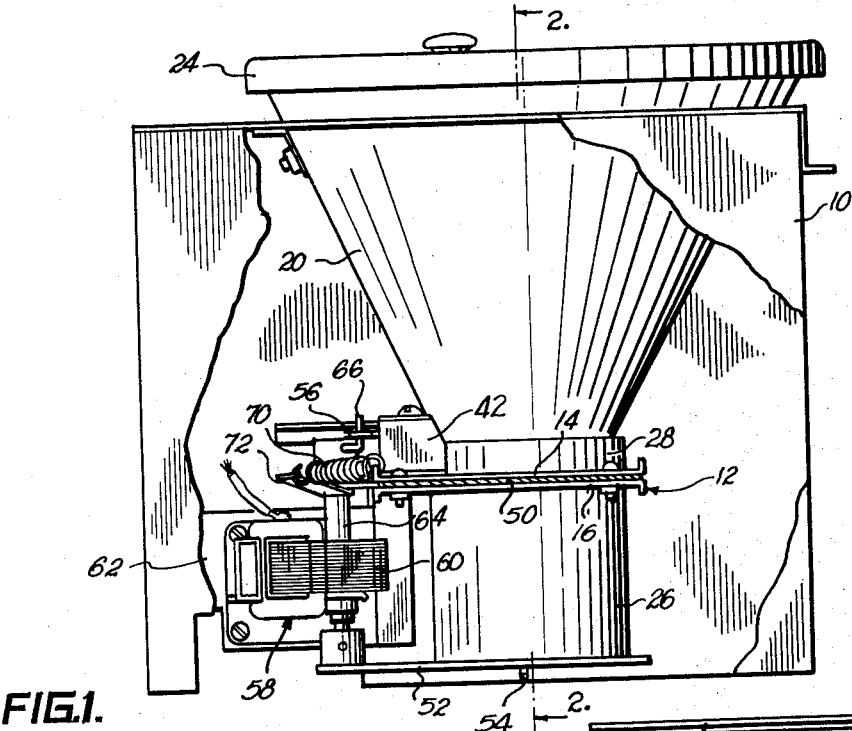
FIG.1.
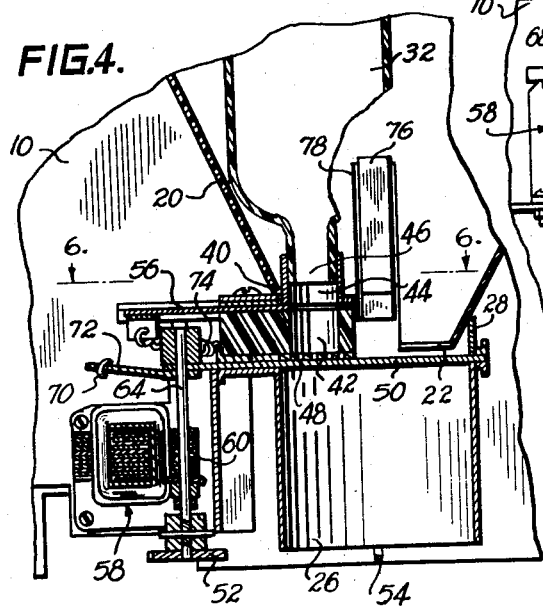
FIG.4.
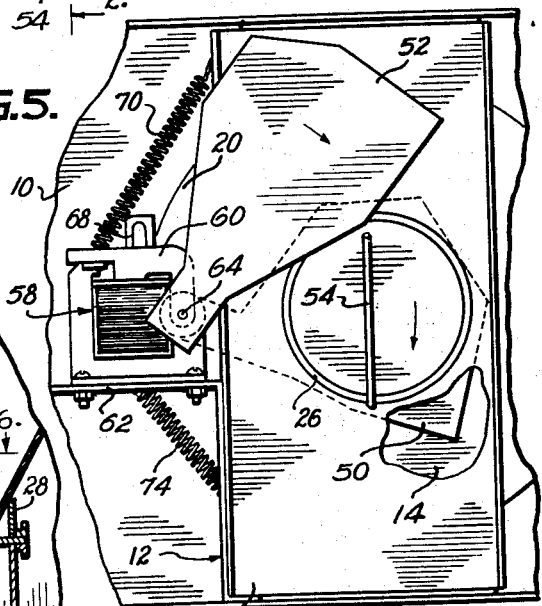
FIG.5.
INVENTOR.
William G. Lippert
BY
ATTORNEY.

Aug. 9, 1960    W. G. LIPPERT    2,948,438
CORN AND SALT DISPENSER FOR POPCORN MACHINES
Filed Sept. 29, 1958    2 Sheets-Sheet 2
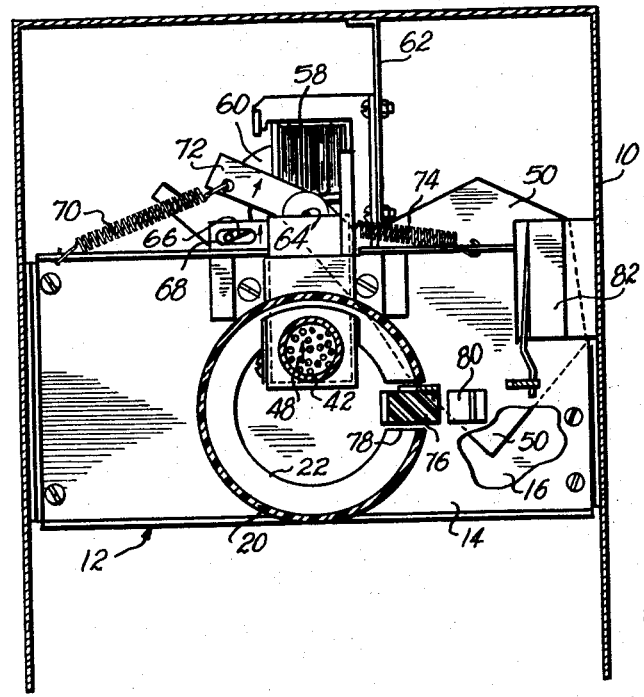
FIG.3.
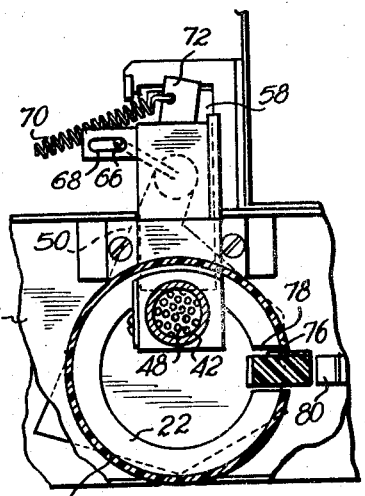
FIG.6.
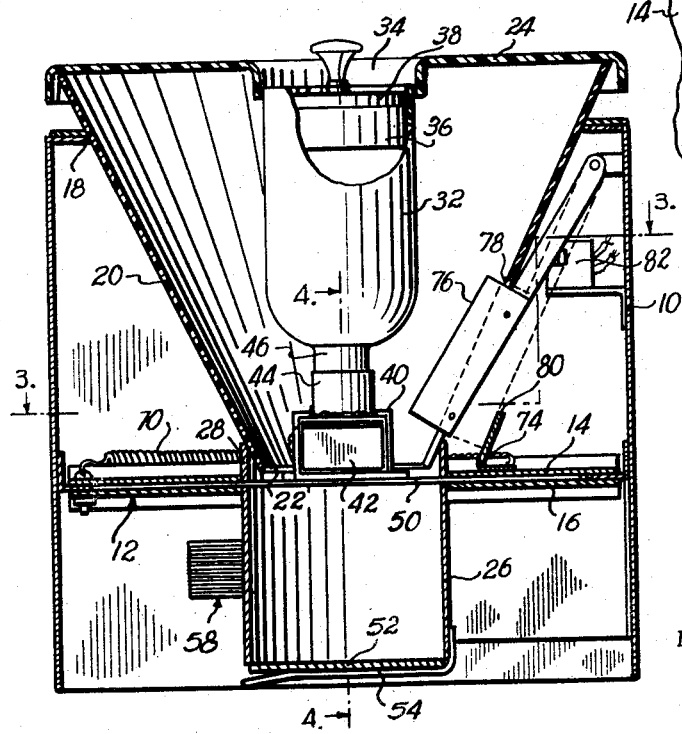
FIG.2.
INVENTOR.
William G. Lippert
BY
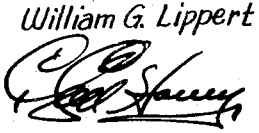
ATTORNEY.

United States Patent Office 2,948,438
Patented Aug. 9, 1960

2,948,438

CORN AND SALT DISPENSER FOR POPCORN MACHINES

William G. Lippert, Kansas City, Mo., assignor to Manley, Inc., Kansas City, Mo., a corporation of Missouri Filed Sept. 29, 1958, Ser. No. 763,935

9 Claims. (Cl. 222—145)

This invention relates to an ingredient dispenser specially adapted for use in connection with popcorn machines and has for its primary object the provision in an unusually small compact unit, of dispensing means for both salt and corn so arranged and constructed as to alleviate the aggravating problems incident to the feeding of granular materials such as salt in a moist environment which normally results in bridging and coagulation.

A related object of the instant invention is to eliminate the problems above alluded to through relatively simple, inexpensive mechanism utilizing but a minimum number of parts.

Still another object of the present invention is to provide a corn and salt dispenser for popcorn machines having an arrangement that advantageously utilizes the flow of corn as a means of clearing the salt and assuring its delivery to the popping kettle without collection within the passages through which the salt must flow from the supply container therefor to the popping kettle.

In the drawings:

Fig. 1 is a side elevational view of a corn and salt dispenser for popcorn machines made pursuant to the present invention, parts being broken away and partially in section for clearness.

Fig. 2 is a vertical, cross-sectional view taken on line 2—2 of Fig. 1.

Fig. 3 is a horizontal, cross-sectional view taken on line 3—3 of Fig. 2.

Fig. 4 is a fragmentary, vertical, cross-sectional view taken on line 4—4 of Fig. 2 showing however the movable parts thereof in a different position.

Fig. 5 is a fragmentary, inverted view showing the movable parts in the same position as in Fig. 4; and Fig. 6 is a fragmentary, cross-sectional view taken on line 6—6 of Fig. 4 but turned at right angles thereto.

An open back and open bottom housing 10 has a horizontal partition 12 therein spanning the distance between its side walls and consisting of a pair of vertically spaced plates 14 and 16. A circular opening 18 in the top wall of housing 10, receives a funnel-shaped supply receptacle 20 for raw popcorn, the receptacle 20 having an open bottom as at 22, and a lid 24 normally covering its open top.

The lowermost end of receptacle 20 communicates with the uppermost open end of a tubular measuring compartment 26 carried by and traversing partition 12. More particularly, the compartment 26 for measuring the raw popcorn consists of a tube integral with plate 16 and depending therefrom, the receptacle 20, a ring 28 and compartment 26 having their vertical axes aligned. Ring 28 is integral with plate 14 and extends upwardly therefrom for receiving the lowermost end of the receptacle 20.

A supply container 32 for granular salt is housed within the receptacle 20 and cleared by an opening 34 in lid 24. A foraminous cup 36 in the container 32 prevents accidental pouring of corn into the container 32 in the event that closure 38 for container 32 is not in place when an operator fills the receptacle 20 with popcorn.

The receptacle 20 is cut away as at 40 adjacent its open bottom 22 for clearing a measuring chamber 42 for salt, chamber 42 being open at its upper and lower ends in the same manner as measuring compartment 26. The measuring chamber 42 has an upstanding spout 44 that frictionally receives neck 46 of container 32, permitting removal of the latter, it being noted that the neck 46 presents an open bottom for the supply container 32. Ring 28 is likewise cut away to clear the chamber 42 and the plate 14 serves as a support for the chamber 42. The open bottom of the chamber 42 is covered by a foraminous plate 48 to prevent corn from entering the chamber 42 and to obviate difficulty in swinging of an uppermost gate about to be described.

The compartment 26 is provided with a pair of gates 50 and 52 in the nature of horizontally swingable plates. Gate 52 normally underlies the open bottom of compartment 26 in closed relationship thereto, and when the same is swung to an open position as shown in Fig. 5, the gate 50 moves into a position overlying the uppermost open end of compartment 26, closing the latter. When the gate 50 is in such position, closing the upper open end of compartment 26, it also underlies the plate 48 in closing relationship to the open lower end of chamber 42. A rod 54 secured to compartment 26, underlies gate 52 when the latter is closed to prevent gate 52 from sagging under the weight of the corn in compartment 26.

A valve 56 in the nature of a flat panel reciprocable rectilinearly along a horizontal path of travel, normally closes the uppermost open end of the chamber 42. Valve 56 moves to the open position whenever the gate 50 swings to a position interposed between chamber 42 and compartment 26.

Actuating means for gates 50 and 52, as well as for the valve 56, consists of a rotary solenoid 58, having a horizontally swingable core 60 and supported by a bracket 62 mounted within the housing 10. Core 60 is fixed to a vertical shaft 64 and the spaced-apart gates 50 and 52 are likewise rigid to shaft 64 for rotation therewith.

An L-shaped crank 66 extending laterally from shaft 64 for rotation therewith and thence upwardly through a slot 68 in the valve 56, reciprocates the latter simultaneously with the swinging of the gates 50 and 52. A spring 70 interconnecting a lateral arm 72 rigid to shaft 64 with partition 12, and a second spring 74 connecting valve 56 with partition 12, cooperate in yieldably holding the gates 50 and 52, as well as the valve 56, in their normal positions. Thus, gates 50 and 52 are swung to the position shown in Fig. 5 and the valve 56 is opened as shown in Fig. 4 whenever the solenoid 58 is energized, retracting its core 60 against the action of springs 70 and 74.

It is apparent from the foregoing that solenoid 58 may be operably coupled in the electric circuit of an automatic popcorn machine for energization periodically during each cycle of operation of the machine. Manifestly, following the dumping of the popping kettle to discharge the popped corn of each batch therefrom, solenoid 58 will be energized to dump a measured amount of raw corn and salt to the kettle, whereupon, after de-energization of the solenoid 58, springs 70 and 74 will return all parts to the normal position. It is contemplated that such automatic operation of the popcorn machine will continue until the supply of corn in receptacle 20 is deplenished.

To this end, therefore, a swingable feeler 76 extends through a slot 78 in the side of receptacle 20 and is swung against a stop 80 when the receptacle 20 is filled with corn. This closes a switch 82 within the aforementioned automatic control circuit. Such switch 82 is coupled in the circuit in such manner as to render the machine inoperative after the level of corn in the receptacle 20 falls to a point where the spring-loaded switch 82 causes the feeler 76 to return to the full-line position shown in Fig. 2.

While the operation of the dispenser is obvious from the foregoing, by way of summary, energization of the solenoid 58 to retract its core 60, rotates shaft 64 to cause gate 52 to swing to the position shown in Fig. 5, thereby opening the lower end of compartment 26 and permitting the salt and corn thereincontained to gravitate to the underlying popcorn kettle (not shown).

At that time, gate 50 moves to a position interposed between compartment 26 and chamber 42, thereby closing the upper end of compartment 26 and preventing further flow of corn thereinto from the receptacle 20. Also, during energization of the solenoid 58, valve 56 is retracted to permit flow of salt into chamber 42 from the container 32.

Consequently, upon de-energization of the solenoid 58, and retraction of the gates 50 and 52, as well as the valve 56, to the normal position shown in Fig. 2, gate 52 and valve 56 re-close. Thus, as soon as gate 50 moves from beneath the corn in receptacle 20 and the salt in chamber 42, such corn and salt flow into the compartment 26, and these ingredients are held within the compartment 26 by the underlying gate 52. Re-closing of the valve 56 prevents additional flow of salt from the container 32 to the chamber 42 until solenoid 58 is again energized.

It can be seen that the valve and gate means, as well as the content of compartment 26, tend to reduce the amount of steam emanating from the kettle, which can pass to the container 32. This tends to reduce coagulation of the salt and bridging of the same within container 22 or chamber 42. Furthermore, since the salt is admixed with the corn in the compartment 26, it does not tend to cling to the walls of the latter; instead, the nature of the corn itself is such that the salt is carried through the compartment 26 into the popping kettle.

Attention is called to the compact nature of the entire assembly made possible by the disposition of the container 32, as well as the chamber 42 within the receptacle 20. Furthermore, by using a common conveying tube in the compartment 26 for both ingredients, and by using horizontally movable gates and valves, the space requirements of the unit are appreciably reduced.

The housing 10 and all of its components, may be completely portable for removal from the popcorn machine at will for purposes of repair, cleaning and even replenishment of the ingredients, if it becomes necessary or desirable to not dispose the unit so that the lid 24 and closure 38 are readily accessible to the operator.

The reference above made to the foraminous plate 48 makes it now apparent that gate 50 will slide freely through the corn to the position closing the upper end of compartment 26, since plate 48 prevents any kernel lodging between the leading edge of gate 50 and partially within the confines of chamber 42.

Having thus described the invention what is claimed as new and desired to be secured by Letters Patent is:

1. In a dispenser, an open bottom supply receptacle for a first ingredient; an open bottom supply container for a second ingredient; a measuring compartment beneath the container and the receptacle, said compartment being open at its upper end and at its lower end, and communicating at its uppermost end with the receptacle; a measuring chamber within the receptacle between the container and the compartment, said chamber being open at its upper end and at its lower end, and communicating at its uppermost end with the container, said uppermost end of the compartment communicating with the lowermost end of the chamber; a pair of gates for the compartment, one of the gates normally closing the lower end of the compartment, the other gate being movable to a position closing the upper end of the compartment and the lower end of the chamber as said one gate is opened; a valve normally closing the upper end of the chamber; and actuating means operably coupled with said gates and with the valve for simultaneously opening said one gate and the valve, and moving the other gate to said position, said chamber discharging its contents downwardly through its said lowermost open end, directly into said compartment, for admixture with the contents of the latter, as said other gate moves out of said position, and as the ingredients from the receptacle gravitate into the compartment.

2. The invention of claim 1, the container being disposed within the receptacle.

3. The invention of claim 1, said gates each comprising a pair of horizontally swingable plates, said other gate being disposed between the chamber and the compartment in closing relationship to the open bottom of said receptacle therebeneath when said other gate is in said position.

4. The invention of claim 1, said valve comprising a panel, reciprocable horizontally and rectilinearly, and disposed in closing relationship to said container therebeneath when the valve closes the upper end of the chamber.

5. The invention of claim 4, said gates each comprising a pair of horizontally swingable plates, said other gate being disposed between the chamber and the compartment in closing relationship to the open bottom of said receptacle therebeneath when said other gate is in said position.

6. The invention of claim 1, said actuating means comprising a solenoid having a rotatable shaft, the gates being rigid to the shaft.

7. The invention of claim 6, said shaft having a crank operably coupled with said valve.

8. In a dispenser, an open bottom supply receptacle for a first ingredient; an open bottom supply container for a second ingredient; a measuring compartment beneath the receptacle, said compartment being open at its upper end and at its lower end, and communicating with the receptacle; a measuring chamber being open at its upper end and at its lower end, and communicating with the container; a pair of gates for the compartment, one of the gates normally closing the lower end of the compartment, the other gate being movable to a position closing the upper end of the compartment and the lower end of the chamber as said one gate is opened; a valve normally closing the upper end of the chamber; and actuating means operably coupled with said gates and with the valve for simultaneously opening said one gate and the valve, and moving the other gate to said position, said valve comprising a panel, reciprocable horizontally and rectilinearly, and disposed in closing relationship to said container therebeneath when the valve closes the upper end of the chamber.

9. The invention of claim 8, said gates each comprising a pair of horizontally swingable plates, said other gate being disposed between the chamber and the compartment in closing relationship to the open bottom of said receptacle therebeneath when said other gate is in said position.

References Cited in the file of this patent

UNITED STATES PATENTS 1,364,653    Taliaferro _____ Jan. 4, 1921